United States Patent Office 3,297,490
Patented Jan. 10, 1967

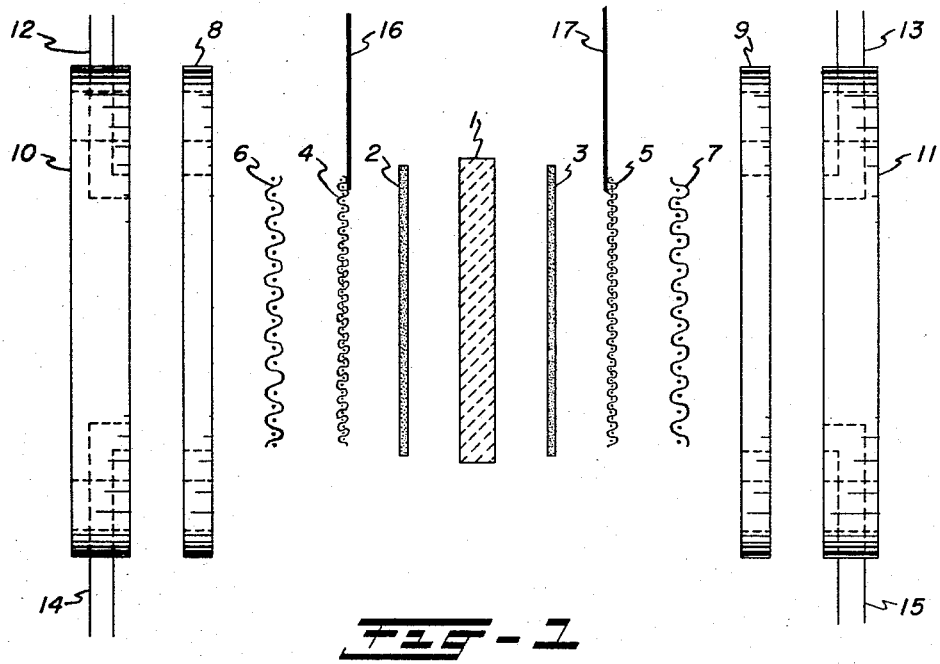
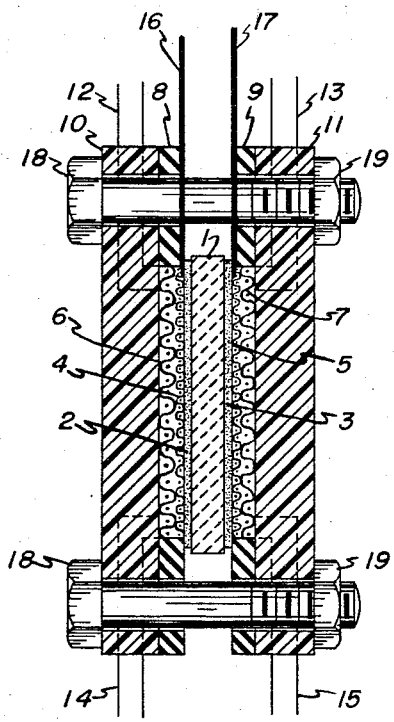
INVENTORS
William A. Barber
Robert C. Haldeman
ATTORNEY

3,297,490
PROCESS FOR PREPARING CATALYST SUPPORT
AND PRODUCT THEREOF
William Austin Barber, Springdale, and Robert George Haldeman, Rowayton, Conn., assignors to American Cyanamid Company, Stamford, Conn., a corporation of Maine
Filed Mar. 1, 1963, Ser. No. 262,114
9 Claims. (Cl. 136—122)

The present invention relates to a novel method for preparing improved catalytic electrodes suitable for use in fuel cells. More particularly, it relates to novel catalytic electrodes formed from specially prepared conductive filler.

The most well-known conductive filler for fuel cell electrodes is carbon derived from lamp black, natural gases and petroleum. Such conductive fillers, unfortunately, are not completely satisfactory, since electrodes prepared therefrom perform rather poorly with increasing current densities and attendant decrease in voltage.

It is, therefore, a principal object of the present invention to provide a formed electrode which permits fuel cells to operate at both high voltages and high current densities. A further object is to provide a straight-forward method for preparing such improved electrodes utilizing a well-defined conductive filler derived from a nitrogen-carbon polymeric source. A still further object is to provide an improved fuel cell employing the hereinbelow defined catalytic electrodes. These and other objects will become apparent from a consideration of the ensuing description.

To this end, it has been unexpectedly found that conductive fillers derived from carbon-nitrogen polymers which have been subjected to pyrolysis at a temperature of about 700° C., or higher, can advantageously be employed as the support for the catalyst in hydrogen-oxygen fuel cells. This permits fuel cells to operate at both high voltages and high current densities.

Surprisingly, conductive filler containing nitrogen-enriched residual mass which is obtained as a pyrolysis product from a wire variety of nitrogen-carbon polymers, is found to be eminently well suited for use as a catalyst support. Pyrolysis is conducted at temperatures usually ranging from about 700° C. to 1000° C., or higher. The recovered black pyrolyzed polymers comprising a major amount of a carbon and a minor amount of nitrogen are uniquely adapted for use as a support in the preparation of catalytic electrodes of the present invention.

A typical analysis of a conductive filler as prepared by heat-treating a polymer such as polyacrylonitrile at temperatures between about 700° C. and 1000° C., or higher, for from about thirty to sixty minutes is as follows:

| | Percent |
|---|---|
| Carbon | 70–95 |
| Total nitrogen | 5–30 |
| Hydrogen | 1–2 |

Illustrative nitrogen-carbon polymers which fall within the purview of the present invention are: polyacrylonitrile, polyvinylpyrrolidone, polyacrylamide, polymethacrylamide, nylon, melamine-formaldehyde, unreaformaldehyde, cellulose nitrate and equivalents thereof. An electrode can be readily prepared utilizing a major amount of the so-prepared conductive filler by incorporating therein minor amounts of catalytic metals.

The aforementioned electrode is tested in a fuel cell, hereinbelow defined, which contains three essential elements: an acid or base electrolyte, electrodes or electrocatalysts and current collectors. Suitable collectors can be perforated or corrugated plates or metallic screens and equivalents thereof.

In order to further clarify the invention employing the specially prepared electrode hereinabove broadly defined, a preferred mode of operation in a typical fuel cell is shown in the accompanying dawing.

In the drawing:

FIG. 1 is an exploded plan view partially in section of a fuel cell employing the electrode of the present invention, and FIG. 2 is a partially expanded side view, partially in section of the fuel cell of FIG. 1.

In FIG. 1, electrolyte [potassium hydroxide or sulfuric acid]-saturated membrane 1 is positioned between the pyrolyzed nitrogen-carbon polymer electrodes 2 and 3 of this invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned extriorly to the current collectors. To the outside of the spacers are gaskets 8 and 9 of any suitable material, such as silicone rubber gaskets. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17 connected onto current collector screens 4 and 5 are conductive members through which current flows from and to the fuel cell via the external circuit when the cell is in operation. The cell is secured by means of bolts 18 and nuts 19 as shown in FIG. 2.

The catalytic electrodes of the above-described fuel cell consist simply of the catalytic powders compressed into wafers. Alternatively, the catalyst powders can be combined with binder water-proofing agents and formed into suitable electrodes.

Illustrative catalytic metals which can be incorporated into pyrolyzed nitrogen-carbon polymers by any method known in the art are: platinum, ruthenium, palladium, silver, copper and nickel. For instance, chloroplatinic acid can be admixed with the pyrolyzed polymers as a suspension and the resultant slurry thereafter subjected to reduction. The product is next washed free from chloride ion and dried. Other methods of metallization such as vacuum evaporation and electrodecomposition, are within the purview of this invention. Usually from one to ten milligrams of the catalytic metal per square centimeter of external electrode surface are incorporated. For electrodes five to fifteen mils thick, this amounts to from about two percent to about twenty percent of the catalytic metal, based on the weight of the carbon support.

A binder or water-proofing material is advantageously employed in preparing the molded electrode. For instance, the binder can constitute a fluorinated hydrocarbon, such as polychlorotrifluoroethylene, polytetrafluoroethylene, polyethylene, styrene-butadiene copolymer, or waxes such as carnauba. The electrode is formed at between about 25° C. and 325° C., or more, while utilizing any conventional pressures, usually from 100 to 5,000 p.s.i. Thicknesses of from 2 to 100 mils can be tolerated, although for many purposes 5 to 15 mils are preferred.

A supporting grid or screen may be employed, if desired, in the electrode forming process. This grid material should be chosen for its ability to withstand the corrosion conditions which may exist in the particular electrolyte system.

The membrane separating the electrode can be any gas impervious membrane saturated with acid or base electrolyte, usually 5 N sulfuric acid or 5 N potassium hydroxide. Ordinary filter paper as well as polymer membranes containing ion exchange materials can be used. The latter material may also be employed in either a leached or water-equilibrated state.

For comparative purposes ordinary filter paper saturated in 5 N sulfuric acid is employed herein as the separating membrane. Electrodes prepared from various carbons and their performance are set forth in the following examples which are merely illustrative and not to be taken as limitative of the invention as claimed. Unless otherwise stated, all parts are by weight.

*Example 1*

Polyacrylonitrile is pyrolyzed in a furnace under vacuum at 750° C. for from thirty to forty minutes. On cooling to room temperature, resultant black pyrolyzed polymer is ground to approximately 200 mesh. The pyrolyzed polymer analyzes on a wet basis 73.8% carbon, 13.5% nitrogen and 1.2% hydrogen. Two parts of the latter are slurried in 80 parts of water. To this is next slowly added .27 part of chloroplatinic acid. Seven (7) parts of a 5% solution of sodium borohydride are added dropwise with constant stirring. Resultant mixture is further stirred for fifteen minutes, brought to a boil, cooled, filtered and washed free from chloride ion. Conductive filler supporting material and catalyst are finally dried under vacuum. A one-half inch diameter electrode is then formed from the resultant conductive filler catalyst modified material.

The fuel cell, assembled with 5 N sulfuric acid membrane, is then operated using hydrogen and oxygen gas as the fuel and oxidizer, respectively.

In the table below are compared results using pyrolyzed polyacrylonitrile as catalyst support with an average and widely employed carbon catalyst support, namely, Stackpole graphite 219 XG.

TABLE I

| Mg. Pt/cm.$^2$ | 5% Platinum on Conductive Filler | Volt at— | | | |
|---|---|---|---|---|---|
| | | 30 | 60 | 100 | 150 ma./cm.$^2$* |
| 2.5 | Pyrolyzed Polyacrylonitrile | .72 | .62 | .50 | .34 |
| 4.0 | Stackpole Graphite 219 XG | .72 | .60 | .37 | 0 |

*Ma./cm.$^2$=Milliamperes per square centimeter.

From the above table as well as in Table II below, it will be seen that, although the loading of platinum catalyst is reduced, the performance using the pyrolyzed polymer exhibits marked superiority over typically employed carbon, especially at high current densities.

*Example 2*

The procedure of Example 1 is repeated in every detail, except that the polyacrylonitrile is pyrolyzed at 904° C. for thirty-five minutes.

Electrode prepared from the pyrolyzed polymer and platinum catalyst is next tested as in Example 1. In the table below there are compared the pyrolyzed polyacrylonitrile as conductive filler to suport a catalyst with a carbon conductive filler devoid of residual nitrogen. It will be seen that the voltage utilizing an electrode prepared from a carbon conductive filler at a current density of 150 milliamperes per square centimeter is zero. The voltage at the same current density utilizing the electrode of the invention is substantially higher.

TABLE II

| Mg. Pt/cm.$^2$ | 5% Platinum on Conductive Filler | Volt at— | | | |
|---|---|---|---|---|---|
| | | 30 | 60 | 100 | 150 ma./cm.$^2$* |
| 2.5 | Pyrolyzed Polyacrylonitrile | .74 | .65 | .55 | .42 |
| 4.0 | Stackpole Graphite 219 XG | .72 | .60 | .37 | 0 |

*Ma./cm.$^2$=Milliamperes per square centimeter.

*Example 3*

The procedure of Example 1 is repeated in every detail, except that melamine-formaldehyde is pyrolyzed at 725° C. for thirty minutes. Platinum is deposited on this material as in Example 1 to give 5% platinum on the resultant treated polymer. The platinum catalyst-conductive filler electrodes are tested as in Example 1 and the results are substantially the same.

*Example 4*

The procedure of Example 1 is repeated, except that urea-formaldehyde is pyrolyzed at 800° C. for forty minutes. Platinum is deposited on this material as in Example 1 to give 5% platinum on resultant treated polymer. The platinum catalyst electrodes are tested as in Example 1 and these give substantially the same performance.

*Example 5*

Nylon powder is pyrolyzed in a furnace under vacuum at 900° C. for one hour. The resulting black pyrolyzed polymer is ground to approximately 100 mesh. Platinum metal is next deposited on this material as in Example 1 above and the catalytic electrode containing 5% platinum metal is tested as in Example 1. A voltage of 0.5 volt at 40 milliamperes per square centimeter is noted.

*Example 6*

The procedure of Example 5 is repeated in every detail, except that the catalyst support is formed by pyrolyzing cellulose nitrate at 900° C. in vacuum for one hour. The performance of the electrode is substantially the same as that of the electrode employed in the test of Example 5.

Advantageously, platinum may be replaced by other noble or active metals, such as palladium, ruthenium, silver and cobalt. Regardless of the catalytic metal, markedly enhanced electrodes are prepared from the pyrolyzed nitrogen-carbon polymer conductive material.

We claim:

1. In an improved process for preparing an electrode adapted for use in a hydrogen oxygen containing gas fuel cell comprising conductive filler and catalytic amounts of an active metal dispersed thereon, the improvement which comprises: incorporating said catalyst into conductive filler, said filler being (a) prepared from a nitrogen-carbon polymer pyrolyzed at temperatures above about 700° C. for from one-half hour to about one hour, and (b) said conductive filler containing a major amount of carbon and a minor amount of nitrogen; and thereafter forming an electrode of enhanced performance at high current densities and voltages.

2. The process according to claim 1, in which the active metal is selected from the group consisting of platinum, palladium, ruthenium, silver, copper, gold and nickel.

3. The process according to claim 1, in which the active metal is platinum.

4. The process according to claim 1, in which the active metal is palladium.

5. The process according to claim 1, in which the conductive filler is derived as a pyrolyzed product from polyacrylonitrile.

6. The process according to claim 1, in which the conductive filler is derived as a pyrolyzed product from melamine-formaldehyde polymer.

7. The process according to claim 1, in which the conductive filler is derived as a pyrolyzed product from urea-formaldehyde powder.

8. The process according to claim 1, in which the conductive filler is derived as a pyrolyzed product from cellulose nitrate.

9. The electrode prepared in accordance with the process of claim 1.

References Cited by the Examiner
UNITED STATES PATENTS

| | | | |
|---|---|---|---|
| 2,758,940 | 8/1956 | Baker et al. | 136—122 |
| 2,962,386 | 11/1960 | Doll et al. | 117—226 X |
| 3,071,637 | 1/1963 | Horn et al. | 136—122 X |
| 3,077,508 | 2/1963 | Oswin | 136—122 X |
| 3,097,974 | 7/1963 | McEvoy et al. | 136—86 X |

ALLEN B. CURTIS, *Primary Examiner.*

WINSTON A. DOUGLAS, *Examiner.*